(12) United States Patent
Dayan et al.

(10) Patent No.: US 8,359,291 B2
(45) Date of Patent: Jan. 22, 2013

(54) ARCHITECTURE-AWARE FIELD AFFINITY ESTIMATION

(75) Inventors: Alon Dayan, Kfar Saba (IL); David Joel Edelsohn, White Plains, NY (US); Olga Golovanevsky, Haifa (IL); Ayal Zaks, Mitzpe Aviv (IL)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/795,769

(22) Filed: Jun. 8, 2010

(65) Prior Publication Data

US 2011/0302561 A1 Dec. 8, 2011

(51) Int. Cl.
*G06F 17/30* (2006.01)
(52) U.S. Cl. ...................................... 707/688
(58) Field of Classification Search .................. None
See application file for complete search history.

(56) References Cited

U.S. PATENT DOCUMENTS

| 6,330,556 B1 | 12/2001 | Chilimbi et al. |
| 2008/0177756 A1 | 7/2008 | Kosche et al. |
| 2008/0256339 A1 | 10/2008 | Xu et al. |
| 2011/0161063 A1* | 6/2011 | Pye ................................. 703/13 |

OTHER PUBLICATIONS

Rubin S. et al., "An Efficient Profile-Analysis Framework for Data-Layout Optimizations". In: Proceedings of the 29th ACM SIGPLAN-SIGACT Symposium on Principles of Programming Languages, pp. 140-153. ACM, New York (2002).

Calder B., "Cache-Conscious Data Placement". In: Proceedings of the 8th International Conference on Architectural Support for Programming Languages and Operating Systems, pp. 139-149. ACM, New York (1998).

Ding C., "Predicting Whole-Program Locality through Reuse Distance Analysis". In: Proceedings of the ACM SIGPLAN'03 Conference on Programming Language Design and Implementation, pp. 245-257. ACM, New York (2003).

Zhong, Y., "Array Regrouping and Structure Splitting Using Whole-Program Reference Affinity". In: Proceedings of the ACM SIGPLAN'04 Conference on Programming Language Design and Implementation, pp. 255-266. ACM, New York (2004).

Hagog M., "Cache Aware Data Layout Reorganization Optimization in GCC. In: Proceedings of the GCC Developers' Summit", pp. 69-92. http://www.gccsummit.org/ (2005).

* cited by examiner

*Primary Examiner* — Bai D. Vu
(74) *Attorney, Agent, or Firm* — Ziv Glazberg

(57) ABSTRACT

A data layout optimization may utilize affinity estimation between pairs of fields of a record in a computer program. The affinity estimation may be determined based on a trace of an execution and in view of actual processing entities performing each access to the fields. The disclosed subject matter may be configured to be aware of a specific architecture of a target computer having a plurality of processing entities, executing the program so as to provide an improved affinity estimation which may take into account both false sharing issues, spatial locality improvement and the like.

25 Claims, 5 Drawing Sheets

ARCHITECTURE-AWARE FIELD AFFINITY ESTIMATION

BACKGROUND

The present disclosure relates to performance optimizations of computer programs in general, and to field affinity estimation based on an execution by a computer having a plurality of processing entities in particular.

Performance of a computer program may be improved based on performance optimizations methods. Such methods include modifying the computer program, also referred to as a target program, to perform in a more efficient manner such as for example to be executed more rapidly, to require less resources such as memory space or draw less power. Although referred to as optimizing performance of the target program, such methods do not necessarily provide the best possible performance. In some cases, performing an optimization may unfortunately lead to a reduction in efficiency of the target program in some executions or even unexpectedly in all executions.

Data layout optimizations are utilized to change an individual record layout used in the target program so as to better correspond to data access patterns exercised by the target program. Some optimizations utilize affinity between fields of the record to determine the record layout in the optimized target program. For example, a record, such as for example a c-like structure, having four fields: f1,f2,f3,f4 may be frequently utilized by the target program by accessing field f2 before accessing field f4 and by accessing field f1 after accessing field f3. The affinity between fields f1 and f3 and between fields f2 and f4 may be utilized. The optimized target program may define a record with the fields arranged in a different manner, such as for example, f3,f1,f2,f4. The different data layout may take into account the order of accesses (e.g., field f3 is often accessed before field f1) and the group of fields accessed in proximate instructions (e.g., fields f3 and f1 are usually accessed together or in relatively close instructions) or the like.

Data layout optimizations may be utilized in a compiler, as is known in the art, to optimize the compiled target program. At compile time, the compiler may utilize the affinity between fields to determine a data layout associated with a record. The data layout may be different than that defined by the target program (e.g., by the code defining the record). The compiler may modify the target program so that the compiled target program may have the substantially same effect as though the data layout was as defined, except for improved performance. The improved performance may be achieved due to spatial locality improvement, as is known in the art.

BRIEF SUMMARY

One exemplary embodiment of the disclosed subject matter is a computer-implemented method for determining affinity estimation between fields of a record in a computer program, the method comprising: obtaining a trace associated with an execution of the computer program by a computer having a plurality of processing entities, the trace comprising at least a first indication and a second indication, the first indication is associated with a first access to a first field of the record, the second indication is associated with a second access to a second field of the record, the first access precedes the second access; determining a first and a second processing entities of the plurality of processing entities associated with the first and the second indications; determining the affinity estimation based on a change in expected performance due to associating the first and second fields in a single cache line in view of performing the first access by the first processing entity and the second access by the second access entity; modifying a data layout of the computer program based on the affinity estimation.

Another exemplary embodiment of the disclosed subject matter is a computerized apparatus for determining affinity estimation between fields of a record in a computer program, the apparatus comprising: a trace obtainer configured to obtain a trace associated with an execution of the computer program by a computer having a plurality of processing entities, the trace comprising at least a first indication and a second indication, the first indication is associated with a first access to a first field of the record, the second indication is associated with a second access to a second field of the record, the first access precedes the second access; a processing entity identification module configured to identify a first and a second processing entities of the plurality of processing entities associated with the first and the second indications; and an affinity estimation module configured to determine the affinity estimation based on a change in expected performance due to associating the first and second fields in a single cache line in view of performing the first access by the first processing entity and the second access by the second access entity.

Yet another exemplary embodiment of the disclosed subject matter is a computer program product for determining affinity estimation between fields of a record in a computer program, the product comprising: a computer readable medium; a first program instruction for obtaining a trace associated with an execution of the computer program by a computer having a plurality of processing entities, the trace comprising at least a first indication and a second indication, the first indication is associated with a first access to a first field of the record, the second indication is associated with a second access to a second field of the record, the first access precedes the second access; a second program instruction for determining a first and a second processing entities of the plurality of processing entities associated with the first and the second indications; a third program instruction for determining the affinity estimation based on a change in expected performance due to associating the first and second fields in a single cache line in view of performing the first access by the first processing entity and the second access by the second access entity; a fourth program instruction for modifying a data layout of the computer program based on the affinity estimation; and wherein the first, second, third, and fourth program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
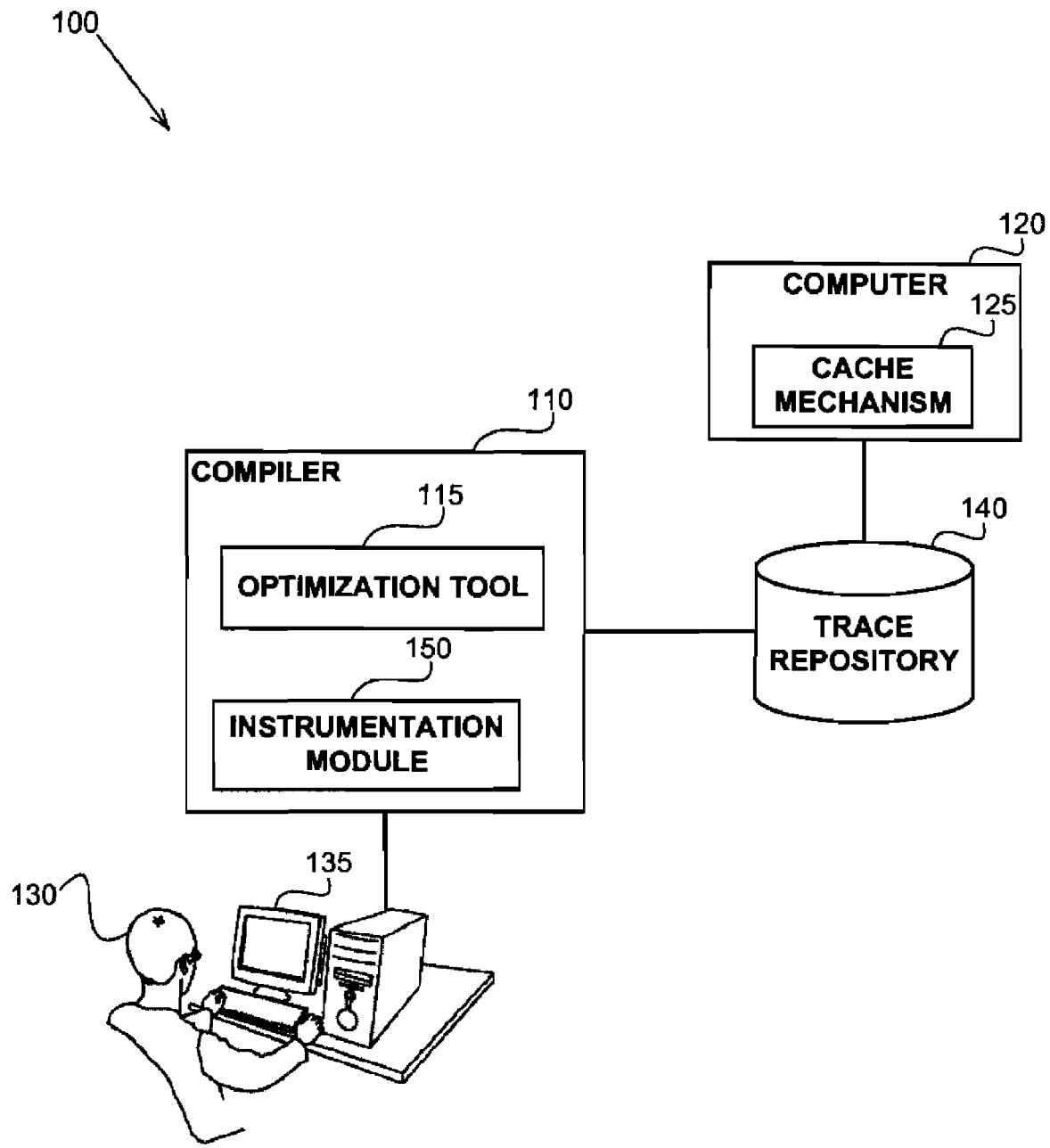
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to estimate affinity between fields of a record in a target program in view of a specific architecture. Another technical problem dealt with by the disclosed subject matter is to incorporate both positive influence of drawing the fields closer and negative influence, such as potential false sharing events, in determining the estimated affinity.

It will be noted that the same statically estimated data access may be performed by different processing entities such as different processor, CPUs, cores, or in the presence of Simultaneous Multithreading (SMT), hardware threads. Decisions made by the Operating System's scheduler on distribution and migration of processes may even further mix the order of data accesses. Additional complexity in the estimation of data affinity is introduced by the effect of false sharing, caused by cache coherence policy.

One technical solution is to utilize a trace of an execution of the target program. The trace may be utilized to identify a processing entity performing each access to the record. By determining the processing entity, and based on prior knowledge of the architecture of a computer executing the target program, a cost-benefit analysis of drawing the fields closer may be performed. In some exemplary embodiments, an estimated latency of the architecture may be utilized for the cost-benefit analysis. Another technical solution is to utilize a superposition cache state in determining the positive and negative effects of drawing the fields together.

One technical effect of utilizing the disclosed subject matter is detecting optimization opportunities based on prior operation of the target computer. Another technical effect of utilizing the disclosed subject matter is to provide for a relatively reliable estimation of field affinity, based on dynamic analysis of the computer program. In some exemplary embodiments, the analysis may be performed after execution of the computer program ends, on-the-fly during execution of the computer program and the like. Yet another technical effect is to provide an architecture-aware field affinity estimation that may provide different optimizations for different architectures.

Referring now to FIG. 1 showing a computerized environment in which the disclosed subject matter is used, in accordance with some exemplary embodiments of the subject matter. A computerized environment 100 may comprise an optimization tool 115. The optimization tool 115 may be configured to detect optimization opportunities in a target program. The optimization tool 115 may be configured to perform field affinity estimation relating to usage of a record by the target program. In some exemplary embodiments, the optimization tool 115 may provide an indication of possible suggested optimizations. In some exemplary embodiments, the optimization tool 115 may modify a data layout of the record to optimize the target program.

The optimization tool 115 may provide a user 130, such as a programmer, a QA engineer or the like, an indication of the optimization opportunity. The user 130 may view the indication using a Man-Machine Interface 135, such as for example a terminal.

In some exemplary embodiments, the optimization tool 115 may be comprised by a compiler 110. The compiler 110 may compile the target program and utilize the optimization tool 115 to determine the data layout of the compiled target program.

The optimization tool 115 may be configured to utilize one or more traces retained in a trace repository 140. The trace repository 140 may be stored in a storage device, such as a storage server, a hard disk, a compact disk, a memory device or the like.

A trace in the trace repository 140 may be outputted by a computer 120 executing the target program or a variation thereof. In some exemplary embodiments, the target program may be instrumented by an instrumentation module 150 to provide an instrumented version of the target program. The instrumented version may be configured to provide a trace comprising entries indicative of access to the record. In some exemplary embodiments, the trace format may comprise an indication of an access type (e.g., read access or write access), a processing entity identifier associated with the performing the access, a name of the field accessed in the record or a similar field identifier. In some exemplary embodiments, additional information may be provided such as timestamp, size of the accessed component, instance identifier, process id (pid), or the like. In some exemplary embodiments, the instrumentation module 150 is comprised by the compiler 110. In other exemplary embodiments, the instrumentation module 150 may not be comprised by the compiler 110. For example, the instrumentation module 150 may be a separate software module in a computer (not shown), which may be initiated by the optimization tool 115, by the user 130 or the like.

In some exemplary embodiments, the trace may be a partial trace indicating accesses during a portion of an execution, portion of the accesses (e.g., accesses only to the record) or the like. In other exemplary embodiments, the trace may be a full trace.

In some exemplary embodiments, the processing entity of the computer 120 may be a hardware thread, a core, a CPU or the like. The processing entity of the computer 120 may be associated with a different portion of a cache mechanism 125. The optimization tool 115 may utilize the identity of the processing entity to determine possible effects of performing two accesses in proximity. The possible effects may be determined due to the configuration of the cache mechanism 125.

Figure 2:
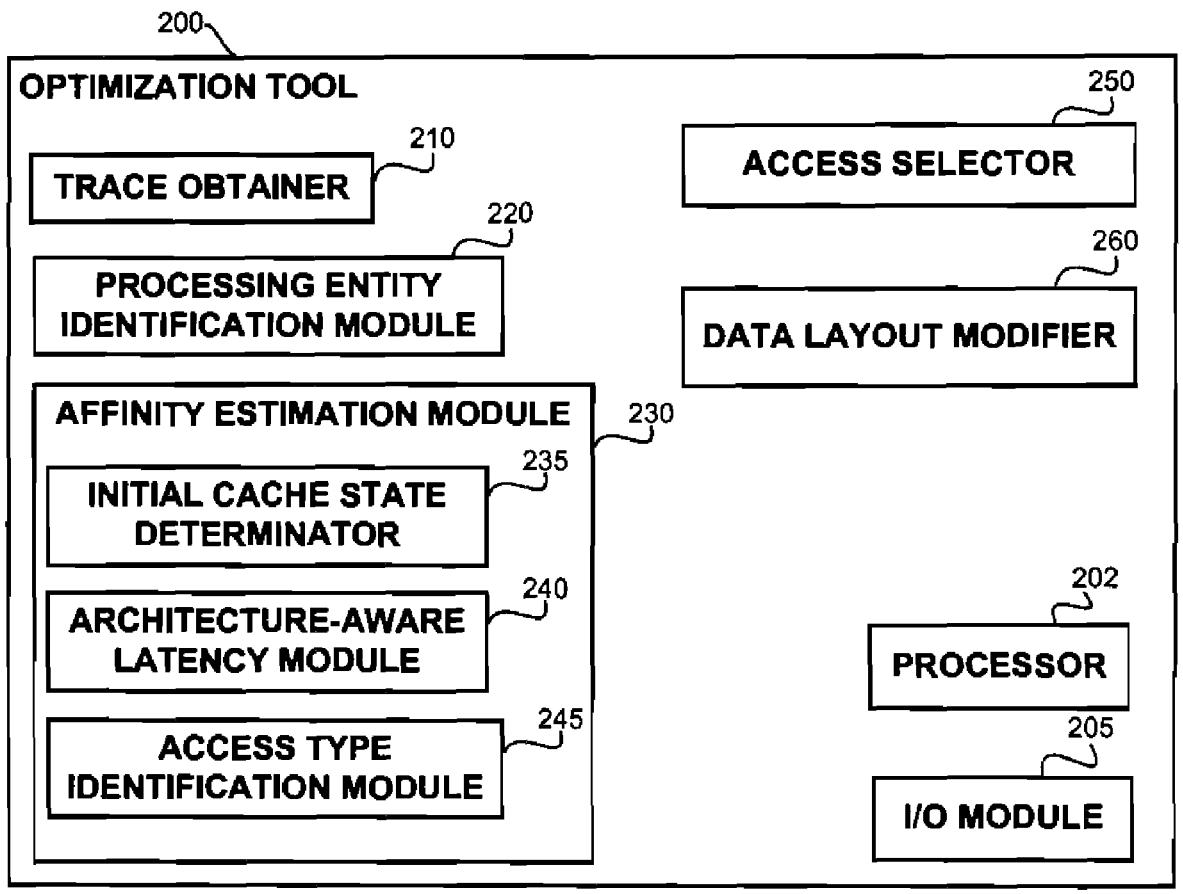
FIG. 2 shows a block diagram of an optimization tool, in accordance with some exemplary embodiments of the disclosed subject matter.

Referring now to FIG. 2 showing an optimization tool in accordance with some exemplary embodiments of the disclosed subject matter. An optimization tool 200, such as 115 of FIG. 1 may be useful for determining affinity between fields. The optimization tool 200 may be configured to determine affinity estimation between fields of a record in a computer program. In some exemplary embodiments, the optimization tool may perform instance-based field affinity estimation. In some exemplary embodiments, the optimization tool 200 may further perform data layout optimization based upon the field affinity estimation.

A trace obtainer 210 may be configured to obtain a trace associated with an execution of the target program. The trace may comprise indications to accesses to fields in instances of the record. The trace obtainer 210 may obtain the trace from a repository, such as 140 of FIG. 1. The trace obtainer 210 may utilize an I/O module 205 to obtain the trace.

A processing entity identification module 220 may be configured to identify a processing entity that performed an access based on the trace. In some exemplary embodiments, the trace may comprise a processing entity identifier, such as a hardware thread id, a CPU id, a core id and the like. In some exemplary embodiments, the computer, such as 120, may comprise processing entities of a plurality of hierarchies. For example, a hardware thread may be a low level processing entity, which may be comprised by a core, which is a higher level processing entity. The trace may comprise an identifier for each level of the hierarchy or for a portion of the hierarchy. For example, a hardware thread id may be utilized to determine the core, as a specific core may be known to contain the hardware thread.

In some exemplary embodiments, the processing entity identification module 220 may perform an algorithm such as:
  determine a number of hardware threads per core (ht_per_core);
  determine a number of cores per CPU (core_per_cpu);
  obtain a hardware thread identifier (ht_id) from the trace;
  compute the CPU id using the following function:
  floor(ht_id/(ht_per_core*core_per_cpu))
  compute the core id using the following function:
  floor((ht_id %(ht_per_core*core_per_cpu))/ht_per_core)

It will be noted that number of hardware threads per core and/or number of cores per CPU may be determined by obtaining pertinent information from input. In one exemplary embodiment, a user may provide the aforementioned numbers based on the specific hardware configuration. An environment module (not shown) may be configured to obtain and/or determine the number of first level processing entities (e.g., hardware threads) comprised by a second level processing entity (e.g., core).

Utilizing the processing entity identification provided by the processing entity identification module 220, an affinity estimation module 230 may determine the affinity estimation based on the different processing entities that performed the accesses.

The affinity estimation module 230 may be configured to determine the affinity estimation between one or more pairs of fields based on an effect of associating the pair of fields together. By associating the pair of fields together, a likelihood that they will be stored in a single cache line may be increased, which may be useful in case they are accessed in proximity and in case that false sharing or similar scenarios do not occur excessively. In some exemplary embodiments, the affinity estimation module 230 may be configured to utilize predetermined knowledge of the cache mechanism, such as 125 of FIG. 1, to determine the effects of drawing the pair of fields into a single cache line.

In some exemplary embodiments, a size of a cache line and sizes of fields may also be used to determine how many fields may be grouped together based on their cumulative sizes.

In some exemplary embodiments, the affinity estimation module 230 may comprise an access type identification module 245. The access type identification module 245 may be configured to determine a type of an access, such as a read access and a write access. Other access types which may affect the cache mechanism 125 may further be identified. The determination may be based on the trace.

In some exemplary embodiments, the affinity estimation module 230 may comprise an initial cache state determinator 235. The initial cache state determinator 235 may be configured to determine an estimated value of the cache mechanism 125. The cache state may be a full cache state or a partial cache state indicative of whether a field is stored in the cache mechanism 125 and in which portion. For example, the partial cache state may be associated only with the location of the second field, which is supposedly about to be accessed. The cache state may, therefore, indicate that the second field is stored in a first portion of the cache mechanism 125; indicate that the second field is stored in a second portion; or indicate that the second field is not stored in the cache mechanism 125. The initial cache state determinator 235 may simulate the cache state based on the trace. The initial cache state determinator 235 may determine the cache state based on other factors.

In some exemplary embodiments, the initial cache state determinator 235 may determine a superposition cache state. The superposition cache state may comprise several alternative possible cache states. Although the cache mechanism 125 may be only in one of the alternative possible cache states at each moment, the superposition cache state may represent the cache state which may be in either of the alternative possible cache states. The superposition cache state may associate each alternative possible cache state with an associated probability to be the state of the cache mechanism 125. For example, a content of a field may either be stored in level one (L1) cache, level two (L2) cache, or not at all. The superposition cache state may comprise a first state in which the field is stored in L1 associated with a 33.33% probability; a second state in which the field is stored in L2 associated with a 33.33% probability; and a third state in which the field is not stored in the cache associated with a 33.33% probability. In some exemplary embodiments, the probabilities of different alternative cache state of the superposition cache state may be different. In some exemplary embodiments, a unified superposition state comprising all possibilities with a unified distribution between the possibilities may be predetermined and utilized by the initial cache state determinator 235. The superposition cache state may be referred to as a non-deterministic cache state, as it provides for a set of alternative deterministic states—only one of which the actual state of the cache mechanism 125, and that state is "unknown" to the optimization tool 200.

In some exemplary embodiments, the affinity estimation module 230 may comprise an architecture-aware latency module 240, also referred to as a latency module 240. The latency module 240 may be configured to determine an estimated latency in performing accesses based on a cache state, such as determined by the initial cache state determinator 235. The latency module 240 may, for example, take into account estimated latency associated with a cache miss/hit, a cache miss/hit of a specific level in a cache hierarchy, memory access, or the like. In some exemplary embodiments, the latency module 240 may be configured with estimated latency parameters associated with the cache mechanism 125. For example, the latency module 240 may assign a 13 cache cycles latency to a L1 cache miss (which may be that the retrieved cache line is not present in the L1 cache but is present in the L2 cache) a 235 cache cycles latency to a L2 cache miss (which may be that the retrieved cache line is not present in both the L1 and L2 caches). In some exemplary embodiments, a processor's specification may include information regarding only hit latency and not to miss latency. However, miss latency may be determined based on the hit latency. For example, a L1 miss latency may be determined based on the L2 hit latency. In some exemplary embodiments, the L1 miss latency may be determined based on the L2 hit latency with a deduction of a L1 hit latency. Other methods to determine or to compute the miss latencies may be used. The latency module 240 may be configured to provide a change in latency of the cache mechanism 125 when performing two accesses to two fields based on the two fields being stored in the same cache line, as opposed to the two fields being stored in different cache lines.

In different exemplary embodiments different latency parameters may be used. Latency parameters may be measured in different measurements and have different scopes. For example, latency may be measured using a time measurement such as milliseconds.

It will be noted that the latency module 240 may be configured to provide latency parameters associated with a cache mechanism different than the actual cache mechanism of the computer 120 that executed the computer program. The latency module 240 may be configured to provide latency parameters associated with a target cache mechanism that may be expected to be utilized when the target program is executed.

In some exemplary embodiments, the latency module 240 may be configured to utilize approximated latency estimation. For example, consider an architecture in which latency of L1 miss and L2 miss are as above (13 cache cycles for L1 miss and 235 cache cycles for L2 miss), an approximated latency of, for example, 100 cache cycles for L1 miss and 1000 cache cycles for L2 miss may be useful, as they preserve an original ratio of one degree of magnitude difference between the L1 miss and L2 miss. Such approximated latency parameters may be used instead of actual numbers, such as to avoid referring to technical literature, using experts, and the like. The disclosed subject matter may provide useful affinity estimation using such latency parameters. Generally, latency of a miss in a first level (e.g., L1, L2) of a cache architecture is smaller in an order of magnitude than latency of a miss in one level above the first level of the cache architecture (e.g., L2, L3 respectively).

In some exemplary embodiments, the affinity estimation module 230 may be configured to perform an algorithm such as:

if two different fields of the record are accessed closely in the trace then:
update affinity between fields based on latency parameters provided the latency module 240

In some exemplary embodiments, the affinity may be increased in case both accesses are performed by the same lowest level processing entity, such as a hardware thread. Hence, avoiding redundant computation of higher level processing entity identifiers, such as core id and CPU id. Also, it may be clear that in case the same lowest level processing entity performs both accesses, the effect of drawing the two fields to a single cache line is positive and may not involve a case of false sharing.

In some exemplary embodiments, an access selector 250 may be utilized to select accesses to be utilized by the affinity estimation module 230. The access selector 250 may be configured to select two accesses performed during a window of predetermined size. In some exemplary embodiments, the window may have a predetermined size in number of accesses, such as for example 20 accesses. In some exemplary embodiments, the window may have a predetermined size in time units, such as accesses performed within 500 milliseconds. In some exemplary embodiments, an access in the trace may be added to a window as long as the gap in time between the access and a previous access is within a predetermined timeframe, such as 10 milliseconds. In some exemplary embodiments, the access selector 250 may be utilized multiple times in respect to one or more sets of accesses of the trace, wherein each set, also referred to as a "window", may comprise accesses which may be considered proximate to one another. It will be noted that different windows may share the same accesses (i.e., the conjunction between two windows may be different than the empty set).

In some exemplary embodiments, the access selector 250 may select accesses to the same instance of the record. The instance of the record may be determined based on an instance identifier provided in the trace, such as for example an address of the instance accessed, an array variable name and a unique index in the array, a unique object identifier or the like. Co-pending patent application Ser. No. 12/729,321, filed on Jan. 17, 2010, entitled "INSTANCE-BASED FIELD AFFINITY OPTIMIZATION", is hereby incorporated by reference for the purpose of disclosing utilization of the instance identifier in affinity estimation.

In some exemplary embodiments, the access selector 250 may select accesses within a "window" which access different fields of the record, instead of performing such a check by the affinity estimation module 230.

In some exemplary embodiments, a data layout modifier 260 may be configured to modify the data layout based on the affinity estimation determined by the affinity estimation module 230. The data layout modifier 260 may take into account affinity between fields, a size of a field, a size of a cache line or the like, in determining which fields to group together. In some exemplary embodiments, the data layout modifier 260 may modify the target program, a binary of the target program, an intermediate representation of the target program or the like. The data layout modifier 260 may utilize a Close Proximity Graph (CPG) as is known in the art to represent the affinity estimation between fields. The CPG may be partitioned into groups, such as Strongly Connected Components (SCCs), as is known in the art. A group of fields may be determined to be drawn closer, as to provide a data layout optimization.

In some exemplary embodiments of the disclosed subject matter, the optimization tool 200 may comprise an Input/Output (I/O) module 205. The I/O module 205 may be utilized by the trace obtainer 210 to receive, retrieve or otherwise obtain a trace, such as for example from a trace repository 140 of FIG. 1. The I/O module 205 may be utilized to provide an output to a user, such as 130 of FIG. 1. The output may comprise indications of the detected optimization opportunities. The I/O module 205 may be utilized to update the target program, such as for example by modifying the binary or the source code of the target program. The I/O module 205 may be utilized by the data layout modifier 260 to modify the target program based on optimization opportunities. The I/O module 205 may be utilized to update the latency parameters of a specific architecture, such as by an expert, a user, automatically through the use of a database or the like.

In some exemplary embodiments, the optimization tool 200 may comprise a processor 202. The processor 202 may be a Central Processing Unit (CPU), a microprocessor, an electronic circuit, an Integrated Circuit (IC) or the like. The processor 202 may be utilized to perform computations required by the optimization tool 200 or any of it subcomponents.

Figure 3:
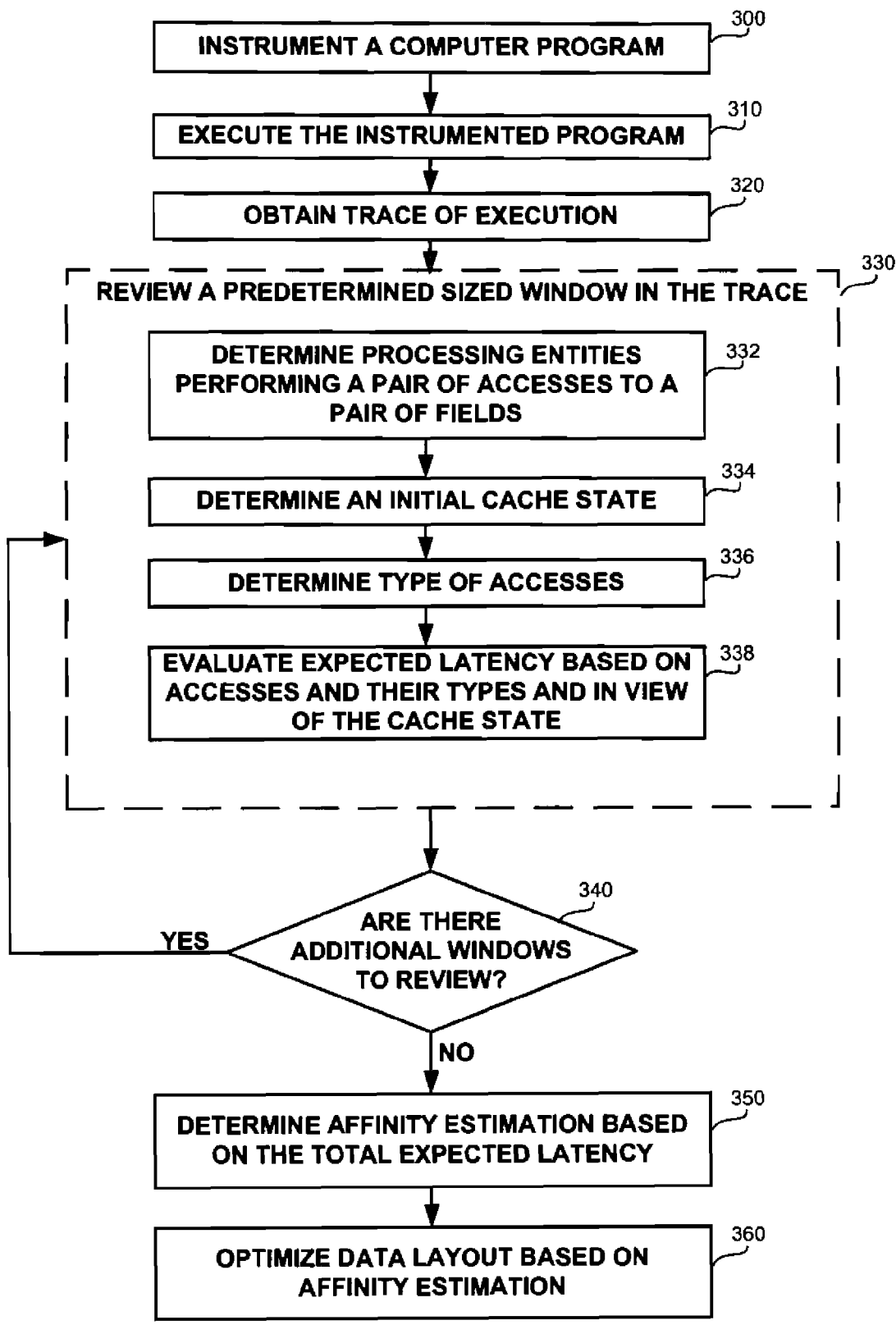
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, a target computer program may be instrumented. The instrumentation may be configured to produce a trace with pertinent information in accordance with the disclosed subject matter. The target program may be instrumented by an instrumentation module, such as 150 of FIG. 1.

In step 310, the instrumented target program may be executed. A computer having a plurality of processing entities, such as 120 of FIG. 1, may execute the instrumented target program.

In step 320, a trace of the execution may be obtained. The trace may be obtained from a trace repository, such as 140 of FIG. 1. The trace may be obtained by a trace obtainer, such as 210 of FIG. 2 which may utilize an I/O module, such as 205 of FIG. 2.

In step 330, a window of the trace may be analyzed. The window may be determined by an access selector, such as 250 of FIG. 2. The window may comprise accesses that may be considered proximate to one another. The window may comprise accesses to the same instance of the record. The window may comprise only accesses to different fields.

In step 332, a processing entities that performed a pair of accesses may be determined. The processing entities may be determined by a processing entity identification module, such as 220 of FIG. 2. In case processing entities have multiple hierarchies, the determination may be of the entire hierarchy, a lowest-common-level processing entity of a pair of accesses or the like. The determination may be useful for determining an effect of performing the accesses by the processing entities in a specific cache mechanism, such as 125 of FIG. 1.

In step 334, an initial cache state may be determined. The cache state may be a "regular" cache state or a superposition cache state. The superposition state may be a unified distribution of all possible cache states in respect to the presence of the content of the field of the second access in the cache. The determination may be performed by an initial cache state determinator, such as 235 of FIG. 2.

In step 336, a type of access may be determined. In some exemplary embodiments, the access type of the first access of a pair is sufficient to determine whether or not the access invalidated a cache line. Therefore, determining the access type of the first access may suffice. In some exemplary embodiments, both type of accesses may affect utilization of the cache mechanism 125. The determination may be performed by an access type identification module, such as 245 of FIG. 2.

In step 338, expected latency may be evaluated, approximated, determined or the like. The expected latency may be calculated based on approximated latency parameters, based on architecture specific latency parameters or the like. The evaluation may be determined by an architecture-aware latency module, such as 240 of FIG. 2. The evaluation may be based on type of accesses, determined in step 336; based on an initial "regular" cache state determined in step 334; based on an initial superposition cache state, determined in step 334; based on the processing entity performing the accesses, determined in step 332; based on other parameters or attributes of the accesses or the like.

In step 340, a determination may be made whether additional windows are to be reviewed. The determination may be based upon reviewing some or all windows of one or more traces, reviewing at most a predetermined number of windows or the like. In some exemplary embodiments, reviewing of windows may be stopped based on utilization of predetermined amount of resources, such as for example time, CPU cycles or other resources. In case an additional window may be reviewed, step 330 may be performed in respect to the additional window. Otherwise, step 350 may be performed.

In step 350, an affinity estimation may be determined based on the latency determined in step 338. In some exemplary embodiments, expected latencies associated with a pair of fields that were calculated during step 338 may be summed. In some exemplary embodiments, some of the expected latency calculations may be indicative of improvement while some may be indicative of decrease in performance. Improvement may be, for example, indicated using a positive number while decrease may be indicated using a negative number. The affinity estimation may be determined in step 350 in respect to one or more pairs of fields. Step 350 may be performed using an affinity estimation module, such as 230 of FIG. 2.

In step 360, data layout of the target program may be optimized based on the affinity estimation. The optimization may be performed by a data layout modifier, such as 260 of FIG. 2. The optimization may be performed during a compilation of the target program. The optimization may be performed in respect to a binary representation of the target program, a source code representation of the target program, an intermediate representation of the target program or the like. The optimization may be performed automatically. In some exemplary embodiments, a user may perform the optimization based on indications provided to him by a computerized device performing steps 320-350 of the method, such as an optimization tool 200 of FIG. 2.

In some exemplary embodiments, the method of FIG. 3 may be performed several times, each time in respect to a different record. In some exemplary embodiments, steps 300-320 may be performed once in such a manner that may obtain traces with information regarding pertinent records. Steps 330-350 may be performed several times in respect to each record.

Figure 4:
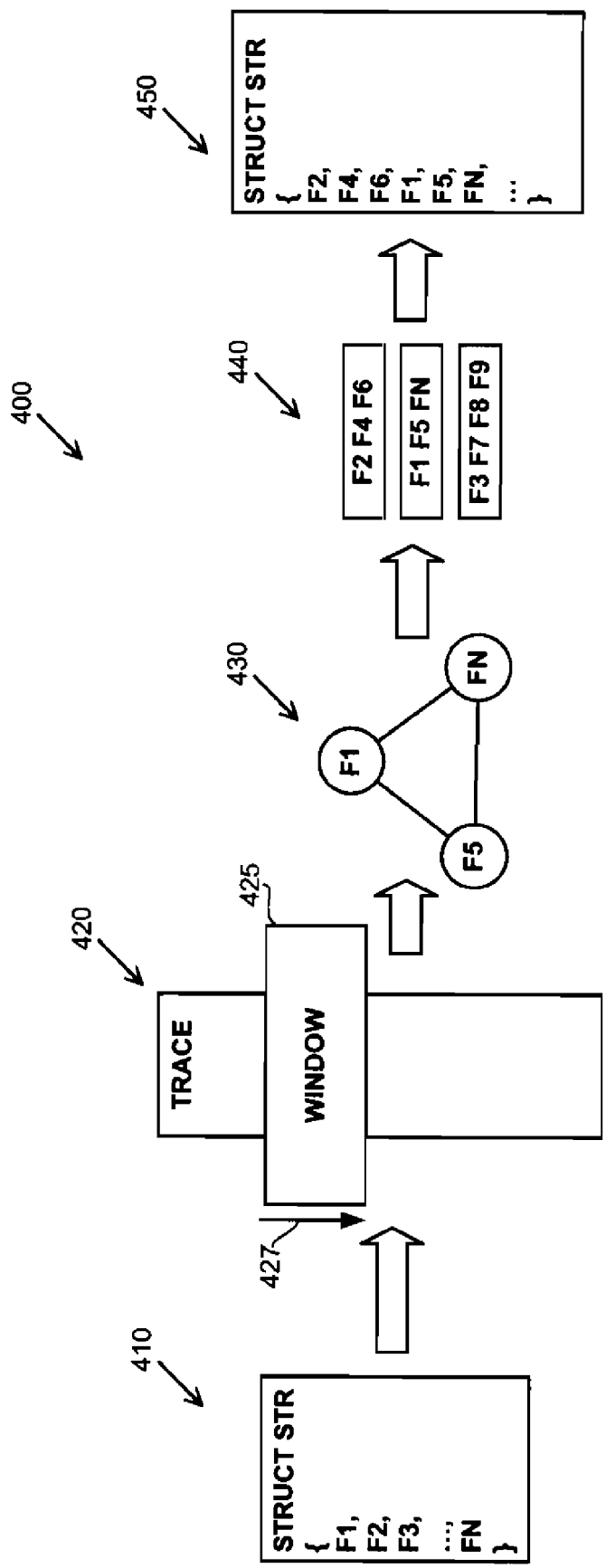
FIG. 4 shows a diagram of a method, in accordance with some exemplary embodiments of the disclosed subject matter.

Referring now to FIG. 4 showing a diagram of a method, in accordance with some exemplary embodiments of the disclosed subject matter. A method 400 is depicted in FIG. 4.

An original data layout of a record 410 defines fields in a record "STR". A trace 420 indicates accesses to fields of the record 410 during one or more executions. The trace 420 provides at least an indication of a processing entity performing each access. A window 425 may be utilized to define which indications of the trace 420 are considered proximate. The window 425 may slide from a beginning of the trace 420 to the end of the trace 420, such as in the direction of arrow 427. In other exemplary embodiments, the different locations of the window 425 may be traversed in a different order.

A CPG 430 may be utilized to represent access relations determined based on the traversal of the window 425 on the trace 420. The CPG may show, for example, that fields f1, f5 and fn are accessed in proximity. The CPG 430 may be utilized to affinity estimation between each pair of fields in the record.

The CPG 430 may be partitioned into groups 440, such as based on SCCs of the CPG 430. For example, the second group of the groups 440 shows that the fields f1, f5 and fn are accessed in proximity.

An output data layout 450 may be determined based on the groups 440. For example, the fields f1, f5, and fn are grouped together, thus increasing the probability that they are retrieved and stored using a single cache line. Such a data layout may increase efficiency of operation of the target program.

Figure 5:
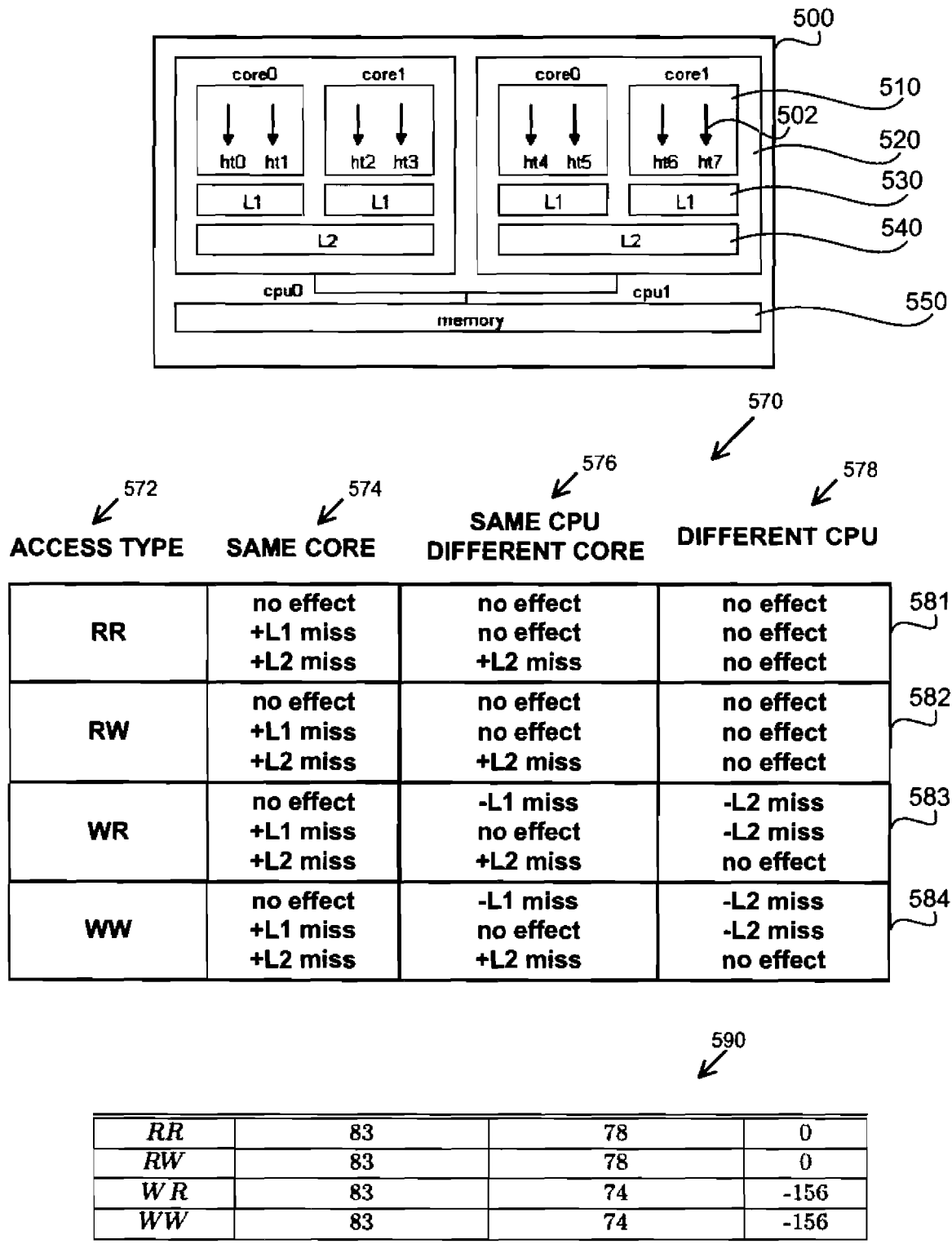
FIG. 5 shows a diagram of a Power5 architecture and associated latency table, in accordance with some exemplary embodiments of the disclosed subject matter.

Referring now to FIG. 5 showing a diagram of a Power5 architecture and associated latency table, in accordance with some exemplary embodiments of the disclosed subject matter. A processor 500 for the IBM® Power5 Platform is a 2-CPU, 4 core architecture with a multi-level cache mechanism. The Processor 500 comprises 2 CPUs, such as CPU 520, and a memory 550. The CPU 520 comprises an L2 cache 540. In addition, the CPU 520 comprises two cores, such as 510, each associated with an L1 cache, such as 530. The core 510 supports SMT and provides for two hardware threads, such as 502, for performing an operation. A processing entity in the processor 500 may be a hardware thread, in a core, in a CPU. Therefore, by determining which hardware thread performs an access, a determination may be made as to which CPU and core are utilized.

As per the specific architecture exemplified with the processor 500, a latency table 570 may be designed and computed to provide for latency parameters 590. The latency table 570 shows an effect of performing two accesses to two fields, in case both fields are contained in a single cache line. The latency table 570 may show an effect based on a previous cache state, such as a previous superposition cache state. Specifically, the latency table 570 shows an effect based on a previous superposition cache state comprising three possibilities: the second field is present in the relevant L1 cache (such as L1 cache 530 for core 510), the second field is present in the relevant L2 cache (such as L2 cache 540 for CPU 520), and the second field is present in the memory 550. The superposition cache state provides a unified distribution over the alternative cache states.

The latency table 570 comprises an access type column 572 showing Read (R) or Write (W) accesses by the first access and by the second access. As can be shown in the table 570, the access type of the second access type might not influence the latency. Therefore, in this specific example, rows 581 and 582, in which the second access type differs (R in 581, and W in 582), are equivalent. The same goes for rows 583 and 584.

The latency table 570 comprises a same core column 574 showing an expected effect of performing both accesses in the same core, and therefore utilizing the same L1 and L2 caches for both accesses. In such a case, in case the second field was not already present in the correct L1 cache, it is retrieved and stored there as an outcome of the first access. Therefore, an L1 miss may be gained, in case the field was previously stored in the L2 cache and an L2 miss may be avoided, in case the field was previously stored in the memory 550. In some exemplary embodiments, processor specification may indicate hit latencies and not miss latencies. However, miss latencies may be derived from the hit latencies. For example, L1 miss latency may be the L2 hit latency and L2 miss latency may be the The latency table 570 comprises a same CPU different core column 576 showing an expected effect of performing both accesses by the same CPU but by using different cores. In such a case, and assuming a read access of first access (rows 581, 582), there is no improvement in case the fields was previously stored in the L1 cache or the L2 cache (as the first access brings the data to a different L1 cache and to the "correct" L2 cache). However, in case the field was not previously in the cache, an L2 miss is avoided and a corresponding latency is gained. On the other hand, in case of a first access performing a write operation (rows 583,584), there is one difference—in case the field was previously stored in the correct L1 cache, the write access which uses a different L1 cache, invalidates the cache line in the L1 cache. Therefore, an L1 miss occurs.

The latency table 570 comprises a different CPU column 578 showing an effect of performing the two accesses in different CPUs, which utilize different L1 and L2 caches. In case of a read access, no effect may be achieved, either positive or negative. In case of a write access (columns 583,584), a negative effect may occur in case the field is previously stored in the correct cache (either L1 or L2), as the write access invalidates the pertinent cache line.

Based on known latency number of the processor 500, latency parameters 590 may be computed. For example, in case of a unified distribution of the superposition state, and in case an L1 miss is 13 cache cycles, and an L2 miss is 235 cache cycles, the latency parameters 590 may be computed based on the table 570. The latency parameters 590 may be utilized by the method of FIG. 3 or by the affinity estimation module 230 of FIG. 2. It will be noted that the latency parameters 590 may be estimated, approximated, or otherwise evaluated based on a specific architecture but without utilizing actual latency numbers of the architecture. It will further be noted that the latency parameters 590 may be normalized, be an estimated latency based on a distribution of the various states of a superposition state, be multiplied by a constant value and the like.

The Power5 architecture, in actuality, comprises with an additional L3 cache. The L3 cache could have been considered by the disclosed subject matter or, as exemplified, the cache mechanism may be simplified or abstracted. By having an understanding on how the cache mechanism of the target computer works, the disclosed subject matter may be utilized to determine appropriate latency parameters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for determining affinity estimation between fields of a record in a computer program, the method comprising:
    obtaining a trace associated with an execution of the computer program by a computer having a plurality of processing entities, the trace comprising at least a first indication and a second indication, the first indication is associated with a first access to a first field of the record, the second indication is associated with a second access to a second field of the record, the first access precedes the second access;
    determining a first and a second processing entities of the plurality of processing entities associated with the first and the second indications;
    determining the affinity estimation based on a change in expected performance due to associating the first and second fields in a single cache line in view of performing the first access by the first processing entity and the second access by the second access entity;
    modifying a data layout of the computer program based on the affinity estimation.

2. The method of claim 1, wherein said obtaining the trace comprises executing an instrumented computer program; the instrumented computer program is configured to provide a substantially similar functionality to that of the computer program, the instrumented computer program is further configured to provide a trace having identifications of processing entities.

3. The method of claim 1, wherein said first and second access are performed within a predetermined-sized window.

4. The method of claim 1, wherein a processing entity of the plurality of processing entities is selected from a group consisting of a CPU, a core and a hardware thread.

5. The method of claim 1, wherein a processing entity of the plurality of processing entities is a first entity of a first hierarchy level and a second entity of a second hierarchy level.

6. The method of claim 5, wherein the first entity is a core and the second entity is a CPU.

7. The method of claim 6, wherein said determining the first and the second processing entities of the plurality of processing entities associated with the first and the second indication comprises:
    determining a first core associated with the first indication;
    determining a first CPU associated with the first core;
    determining a second core associated with the second indication; and
    determining a second CPU associated with the second core.

8. The method of claim 5,
wherein the computer having a multi-level cache mechanism;
wherein the first entity is associated with a first level cache of the multi-level cache mechanism;
the second entity is associated with a second level cache of the multi-level cache mechanism; and
wherein said determining the affinity estimation is performed based on an effect of associating the first and second fields in a single cache line in respect to a cache state of the multi-level cache mechanism; wherein the cache state comprises a first state of the first level cache and a second state of the second level cache; and wherein the cache state indicates at least the presence of the first and second fields.

9. The method of claim 8, wherein the cache state is a superposition cache state having a plurality of alternative cache states and corresponding probabilities.

10. The method of claim 8, wherein said determining the affinity is performed further based on an expected latency of the computer in respect to the cache state.

11. The method of claim 1 further comprises:
determining an access type of the first access; and
wherein said determining the affinity estimation is performed further based on the access type.

12. The method of claim 11, wherein the access type is selected from the group consisting of a write access and a read access.

13. A computerized apparatus for determining affinity estimation between fields of a record in a computer program, the apparatus comprising:
a processor and a memory;
a trace obtainer configured to obtain a trace associated with an execution of the computer program by a computer having a plurality of processing entities, the trace comprising at least a first indication and a second indication, the first indication is associated with a first access to a first field of the record, the second indication is associated with a second access to a second field of the record, the first access precedes the second access;
a processing entity identification module configured to identify a first and a second processing entities of the plurality of processing entities associated with the first and the second indications; and
an affinity estimation module configured to determine the affinity estimation based on a change in expected performance due to associating the first and second fields in a single cache line in view of performing the first access by the first processing entity and the second access by the second access entity.

14. The computerized apparatus of claim 13 further comprising an output module configured to provide an indication of the affinity estimation determined by said affinity estimation module.

15. The computerized apparatus of claim 13 further comprising a data layout modifier module configured to modify the computer program based on the affinity estimation determined by said affinity estimation module.

16. The computerized apparatus of claim 13, further comprising an instrumentation module configured to instrument the computer program to provide an instrumented version of the computer program; the instrumented version of the computer program is configured to provide a trace having identifications of processing entities; and wherein said processing entity identification module is configured to utilize the identifications of the processing entities.

17. The computerized apparatus of claim 13, wherein said affinity estimation module comprising an initial cache state determinator configured to estimate a cache state of a cache mechanism of the computer prior to performing the first and second accesses; the cache state indicates whether the first and second fields are stored in the cache mechanism.

18. The computerized apparatus of claim 17, wherein the cache mechanism is a multi-level cache mechanism; wherein the initial cache state determinator is configured to determine the cache state in respect to the multi-level cache mechanism.

19. The computerized apparatus of claim 18, wherein a processing entity is associated with one or more caches of the multi-level cache mechanism; and wherein said affinity estimation module is configured to determine the affinity estimation based on the effect of performing the first and second accesses by the first and second processing entities based on a cache state of corresponding caches of the multi-level cache mechanism.

20. The computerized apparatus of claim 17, wherein the initial cache state determinator is configured to determine a superposition cache state.

21. The computerized apparatus of claim 17, wherein said affinity estimation module comprising an architecture-aware latency module configured to determine an estimated latency in performing the first and the second accesses based on the cache state in view of the cache mechanism.

22. The computerized apparatus of claim 17, wherein said architecture-aware latency module is operative to be configured by a user.

23. The computerized apparatus of claim 17, wherein said affinity estimation module comprising an access type identification module configured to determine an access type of an access.

24. The computerized apparatus of claim 17, further comprising an access selector configured to select access within a predetermined-sized window.

25. A computer program product for determining affinity estimation between fields of a record in a computer program, the product comprising:
a non-transitory computer readable medium;
a first program instruction for obtaining a trace associated with an execution of the computer program by a computer having a plurality of processing entities, the trace comprising at least a first indication and a second indication, the first indication is associated with a first access to a first field of the record, the second indication is associated with a second access to a second field of the record, the first access precedes the second access;
a second program instruction for determining a first and a second processing entities of the plurality of processing entities associated with the first and the second indications;
a third program instruction for determining the affinity estimation based on a change in expected performance due to associating the first and second fields in a single cache line in view of performing the first access by the first processing entity and the second access by the second access entity;
a fourth program instruction for modifying a data layout of the computer program based on the affinity estimation; and
wherein said first, second, third, and fourth program instructions are stored on said computer readable medium.

* * * * *